M. T. MILES.
TOE WEIGHT.
APPLICATION FILED APR. 1, 1912.
1,049,126.
Patented Dec. 31, 1912.
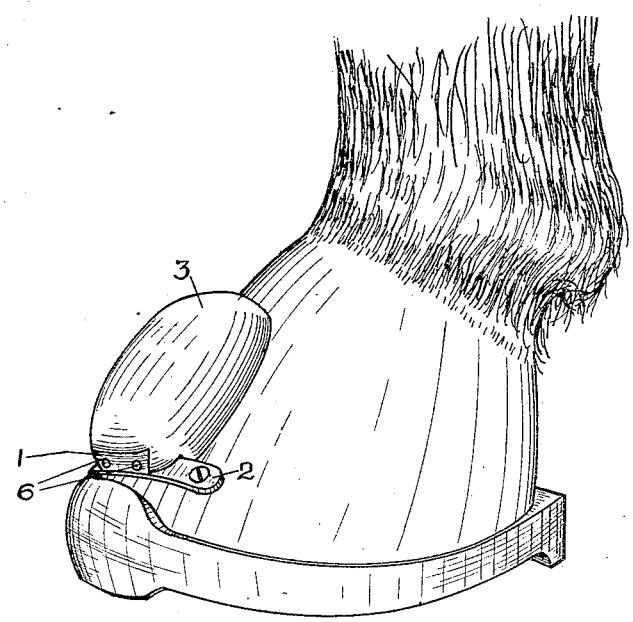
Fig. 1.
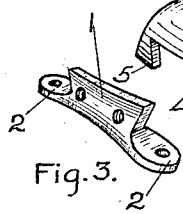
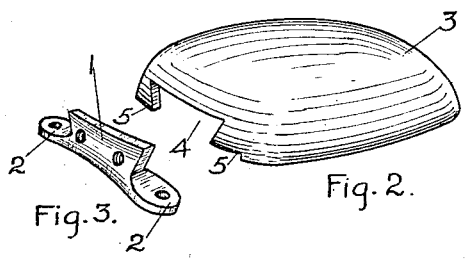
Fig. 3.
Fig. 2.
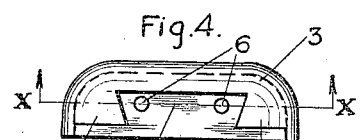
Fig. 4.
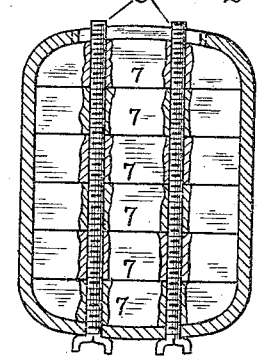
Fig. 5.
Witnesses.
R. W. Stone
B. J. Richards
Inventor.
Marshal Thomas Miles.
By Joshua R. H. Born
his Attorney.

UNITED STATES PATENT OFFICE.

MARSHAL THOMAS MILES, OF CHICAGO, ILLINOIS.

TOE-WEIGHT.

1,049,126.  Specification of Letters Patent.  Patented Dec. 31, 1912.

Application filed April 1, 1912. Serial No. 687,801.

*To all whom it may concern:*

Be it known that I, MARSHAL THOMAS MILES, a citizen of the United States, and a resident of the city of Chicago, county of Cook, and State of Illinois, have invented certain new and useful Improvements in Toe-Weights, of which the following is a specification.

My invention relates to improvements in toe weights adapted to be secured to horses' hoofs, and has for its object the provision of a device of this character which is of simple construction and efficient in operation.

The invention consists in the combinations and arrangements of parts hereinafter described and claimed.

The invention will be best understood by reference to the accompanying drawings forming a part of this specification, and in which—

Figure 1 is a perspective view of a toe weight embodying my invention and shown as attached to a horse's hoof, Fig. 2, a perspective view of a casing employed in the construction, Fig. 3, a perspective view of a securing block employed in the construction, Fig. 4, an end view of the weight, and Fig. 5, a section taken on line $x$—$x$ of Fig. 4.

The preferred form of construction, as illustrated in the drawings, comprises a dovetail securing block 1 provided with perforated ears 2 at its ends adapted to be secured to a horse's hoof by means of screws passing through said perforations, as indicated in Fig. 1. A casing 3 is provided with a dovetailed notch 4 and notches 5 which are adapted to pass over and engage dovetail block 1 and ears 2, as indicated. Two screws 6 are threaded in casing 3 and traverse said casing and are also threaded in block 1 to secure said casing to said block, as indicated. A series of weights 7 are shaped to fit within casing 3 and are threaded onto screws 6, as shown. By this arrangement, it will be observed that casing 3 may be readily attached to or removed from the horse's hoof and weights 7 removed or replaced in casing 3 so as to vary the weight on the horse's hoof to suit the animal. The specific form of construction will be found to be strong and durable and will hold the weights 7 against rattling in casing 3 even when some of the weights have been removed.

While I have illustrated and described the preferred form of construction for carrying my invention into effect, this is capable of variation and modification without departing from the spirit of the invention. I, therefore, do not wish to be limited to the exact details of construction set forth, but desire to avail myself of such variations and modifications as come within the scope of the appended claims.

Having described my invention, what I claim as new and desire to secure by Letters Patent, is:

1. A toe weight comprising a dovetail securing block having perforated ears at its ends adapted to be secured to a horse's hoof; a casing detachably secured to said block, said casing being provided with a dovetail notch adapted to receive said block; and a plurality of weights detachably secured in said casing, substantially as described.

2. A toe weight comprising a dovetail securing block having perforated ears at its ends adapted to be secured to a horse's hoof; a casing detachably secured to said block, said casing being provided with a dovetail notch adapted to receive said block; two screws threaded in said casing and said block and traversing said casing; and a plurality of weights in said casing and threaded on said screws, substantially as described.

In testimony whereof I have signed my name to this specification in the presence of two subscribing witnesses.

MARSHAL THOMAS MILES.

Witnesses:
 JOSHUA R. H. POTTS,
 ARTHUR A. OLSON.

Copies of this patent may be obtained for five cents each, by addressing the "Commissioner of Patents, Washington, D. C."